(12) United States Patent
Stryker et al.

(10) Patent No.: US 7,441,786 B2
(45) Date of Patent: Oct. 28, 2008

(54) CONVERTIBLE LOW PROFILE ROLLER AND SUPPORT BASE

(75) Inventors: Martin W. Stryker, Kalamazoo, MI (US); James Thwaites, Delton, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 11/354,801

(22) Filed: Feb. 15, 2006

(65) Prior Publication Data

US 2006/0197299 A1 Sep. 7, 2006

Related U.S. Application Data

(60) Provisional application No. 60/659,269, filed on Mar. 7, 2005.

(51) Int. Cl.
*B60B 27/00* (2006.01)
*B60B 1/00* (2006.01)
*B60B 11/10* (2006.01)
*B60B 15/26* (2006.01)
*B60B 19/00* (2006.01)
*B60B 33/00* (2006.01)

(52) U.S. Cl. .................. 280/79.11; 301/5.23; 301/40.2; 301/5.1; 16/45; 16/46; 16/47

(58) Field of Classification Search ................ 301/5.23, 301/40.2, 5.1; 16/47, 46, 45
See application file for complete search history.

(56) References Cited

U.S. PATENT DOCUMENTS

| | | | |
|---|---|---|---|
| 697,735 A * | 4/1902 | Magoun | ......................... 16/26 |
| 1,743,255 A | 1/1930 | Vervoort | |
| 2,133,423 A | 10/1938 | Burrow | |
| 2,502,929 A | 4/1950 | Clark | |
| 3,724,022 A | 4/1973 | Alberti et al. | |
| 3,880,481 A | 4/1975 | George | |
| 4,045,096 A | 8/1977 | Lidov | |
| 4,715,460 A * | 12/1987 | Smith | ......................... 180/7.1 |
| 4,733,737 A * | 3/1988 | Falamak | ..................... 180/7.1 |
| D318,219 S * | 7/1991 | Guile | ......................... D8/375 |
| 5,097,565 A | 3/1992 | Shorey | |
| 5,374,879 A * | 12/1994 | Pin et al. | ..................... 318/139 |
| 5,412,838 A | 5/1995 | Yang | |
| 5,423,195 A * | 6/1995 | Peters | ....................... 62/457.7 |
| 5,694,662 A | 12/1997 | Bordeleau | |
| 6,195,838 B1 | 3/2001 | Mains et al. | |
| 6,223,388 B1 | 5/2001 | Sey | |
| 6,230,343 B1 | 5/2001 | Buiskool et al. | |
| 6,502,280 B2 | 1/2003 | Looker | |

(Continued)

*Primary Examiner*—C P Ellis
*Assistant Examiner*—John R Olszewski
(74) *Attorney, Agent, or Firm*—Van Dyke, Gardner, Linn & Burkhart, LLP

(57) ABSTRACT

A low profile roller includes a wheel mounted on a hollow hub and having a roller ball mounted within the hollow hub. The roller is configured to function in a first, low profile operating mode when the roller ball is in contact with a support surface and in a second, high profile mode when the wheel is in contact with the support surface. A base for a movable support platform includes a base frame and a pivot sleeve rotatably mounted to the base frame and non-rotatably mounted to an arm connected to the hub. The pivot sleeve is configured to rotate the low profile roller from between the first mode and the second mode. A butterfly foot pedal is operably connected to the pivot sleeve.

22 Claims, 14 Drawing Sheets

U.S. PATENT DOCUMENTS

| | | |
|---|---|---|
| 6,796,618 B2 * | 9/2004 | Harris ..................... 301/5.1 |
| 2003/0037410 A1 | 2/2003 | Yamaguchi et al. |
| 2003/0115716 A1 | 6/2003 | Polevoy et al. |
| 2004/0021278 A1 * | 2/2004 | Lyden ..................... 280/11.31 |

* cited by examiner

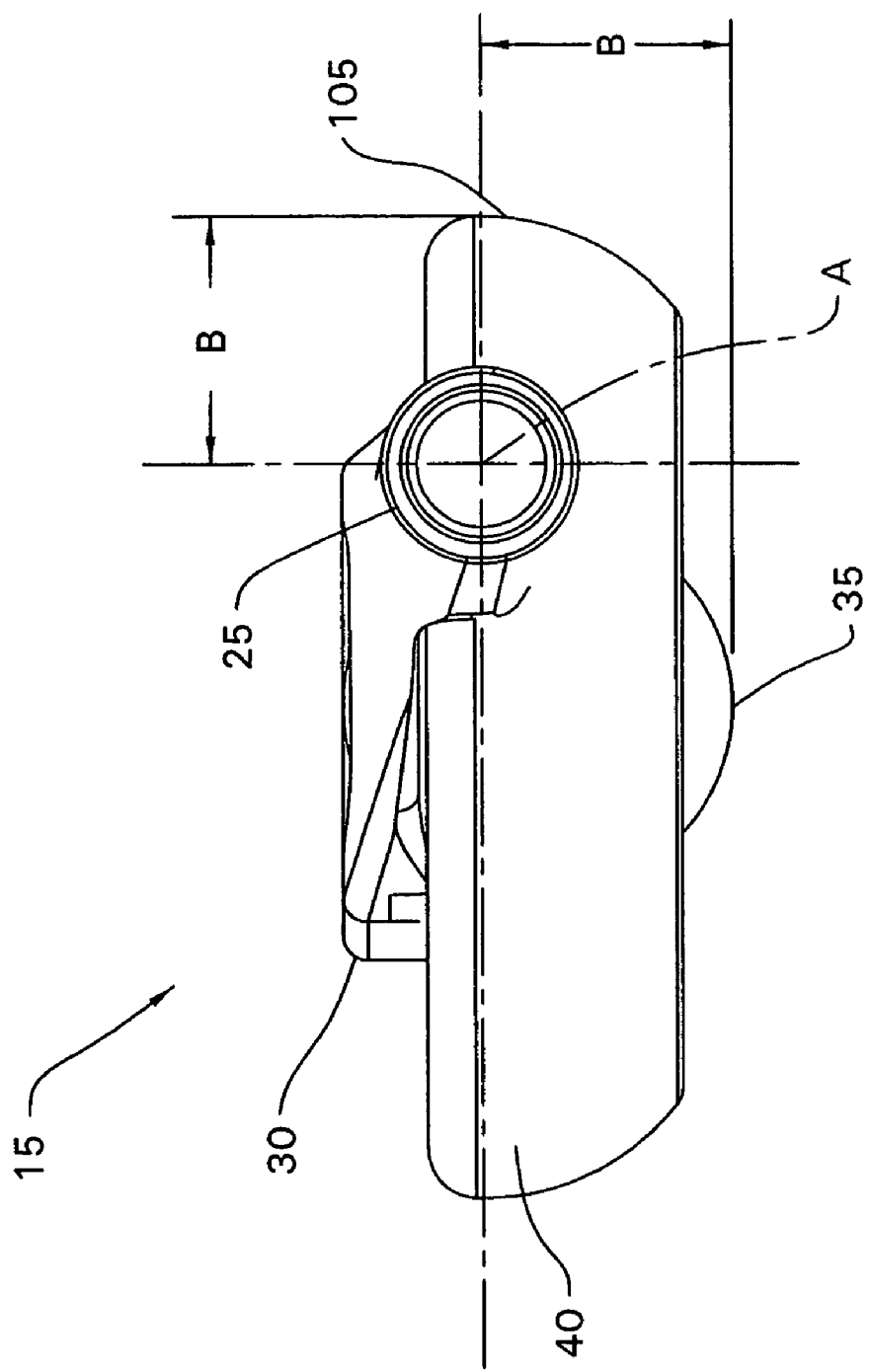

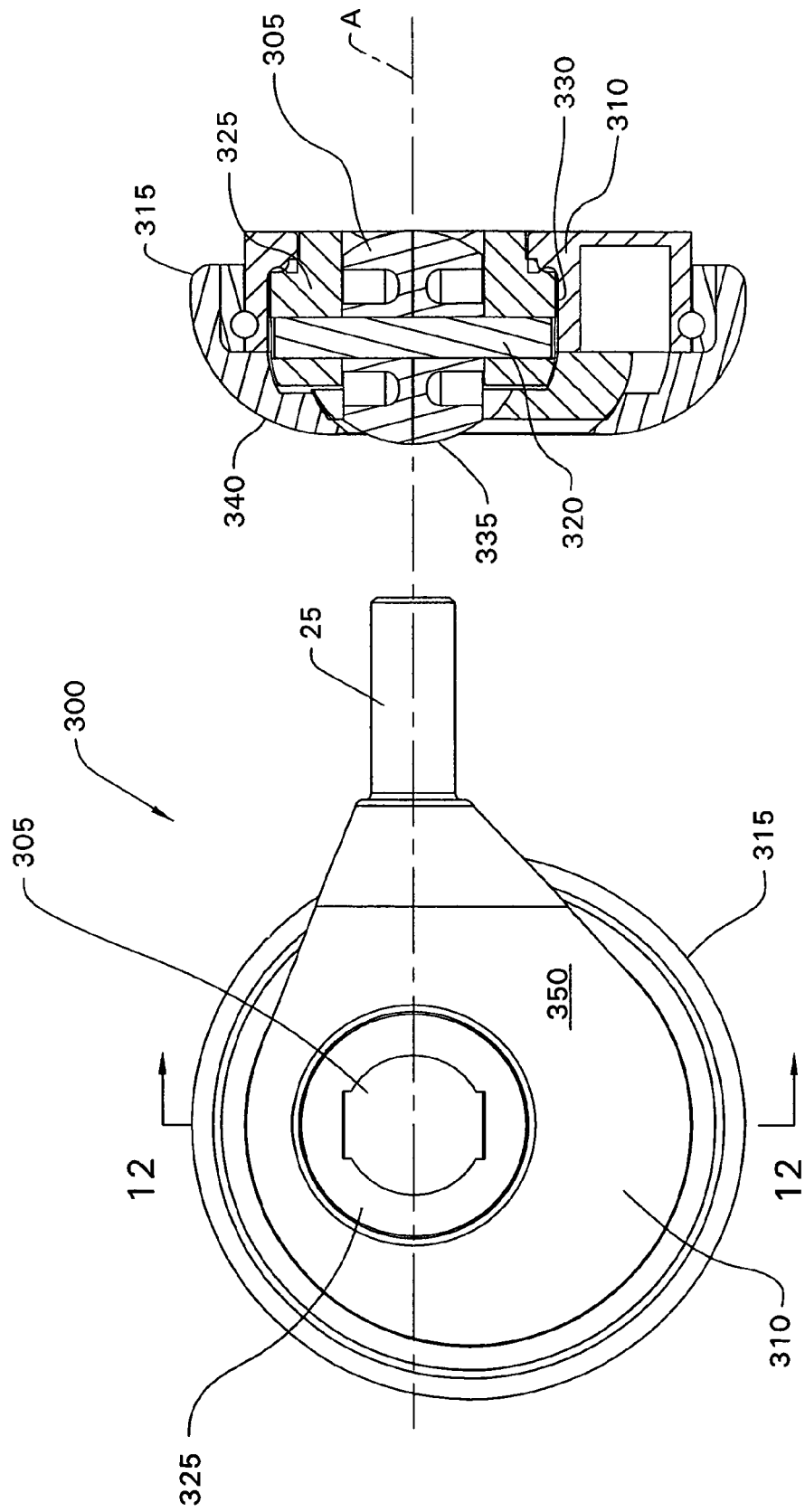

CONVERTIBLE LOW PROFILE ROLLER AND SUPPORT BASE

CROSS REFERENCE TO RELATED APPLICATIONS

This application claims the benefit of U.S. Provisional Application Ser. No. 60/659,269, filed Mar. 7, 2005, which is incorporated herein by reference in its entirety.

BACKGROUND OF THE INVENTION

1. Field of the Invention

The invention relates to rolling supports. In one of its aspects, the invention relates to a low profile roller. In another of its aspects, the invention relates to a low profile roller that is readily convertible from a first, low profile operating mode to a second, higher profile operating mode. In another of its aspects, the invention relates to a support base employing a convertible roller to work in a low profile mode or a high profile mode.

2. Description of Related Art

Hospital equipment, such as overbed tables, are known to have either conventional wheels or low profile, small radius casters to provide the equipment with a low profile base for rolling under other equipment bases. The conventional, larger radius wheels are advantageous for rolling the equipment over greater distances or uneven flooring, but are not well adapted for rolling under the support base of other equipment. The low profile, small radius casters are ill-suited for transporting the equipment over longer distances or uneven floor surfaces, such as when equipment is moved from room to room within the hospital.

It would be advantageous to provide a rolling support system that can demonstrate the advantage of the larger radius wheel for transport over longer distances and uneven surfaces in a first, transport mode, and the advantage of a lower profile for clearance underneath other equipment bases in a second, low profile mode. It would further be advantageous to provide such a rolling support system that is configured for ready conversion between the transport mode and the low profile mode.

BRIEF SUMMARY OF THE INVENTION

A convertible low profile roller includes a hub, a first roller rotatably mounted to the hub, and a second roller rotatably mounted to the hub. The first roller is configured to contact a floor surface with the hub in a first orientation and the second roller is configured to contact the floor surface with the hub in a second orientation.

A base for a movable support platform includes a base frame. A convertible low profile roller includes a frame having an arm and a hub, a roller ball rotatably mounted to the hub, and a wheel rotatably mounted to the hub. A pivot sleeve is rotatably mounted to the base frame and non-rotatably mounted to the arm, and is configured to rotate the low profile roller from a first operating position wherein the ball roller is in rolling contact with a support surface and a second operating position wherein the wheel is in rolling contact with the support surface. A butterfly foot pedal is operably connected to the pivot sleeve.

BRIEF DESCRIPTION OF THE SEVERAL VIEWS OF THE DRAWINGS

The present invention will become more fully understood from the detailed description and the accompanying drawings, wherein:

FIG. 3B is an end view of the convertible low profile roller of FIGS. 1-2.

FIG. 11 is a top view of a convertible low profile roller according to a further embodiment of the invention.

FIG. 12 is a cross-sectional view taken through line 12-12 of FIG. 11.

DETAILED DESCRIPTION OF THE INVENTION

Figure 1:
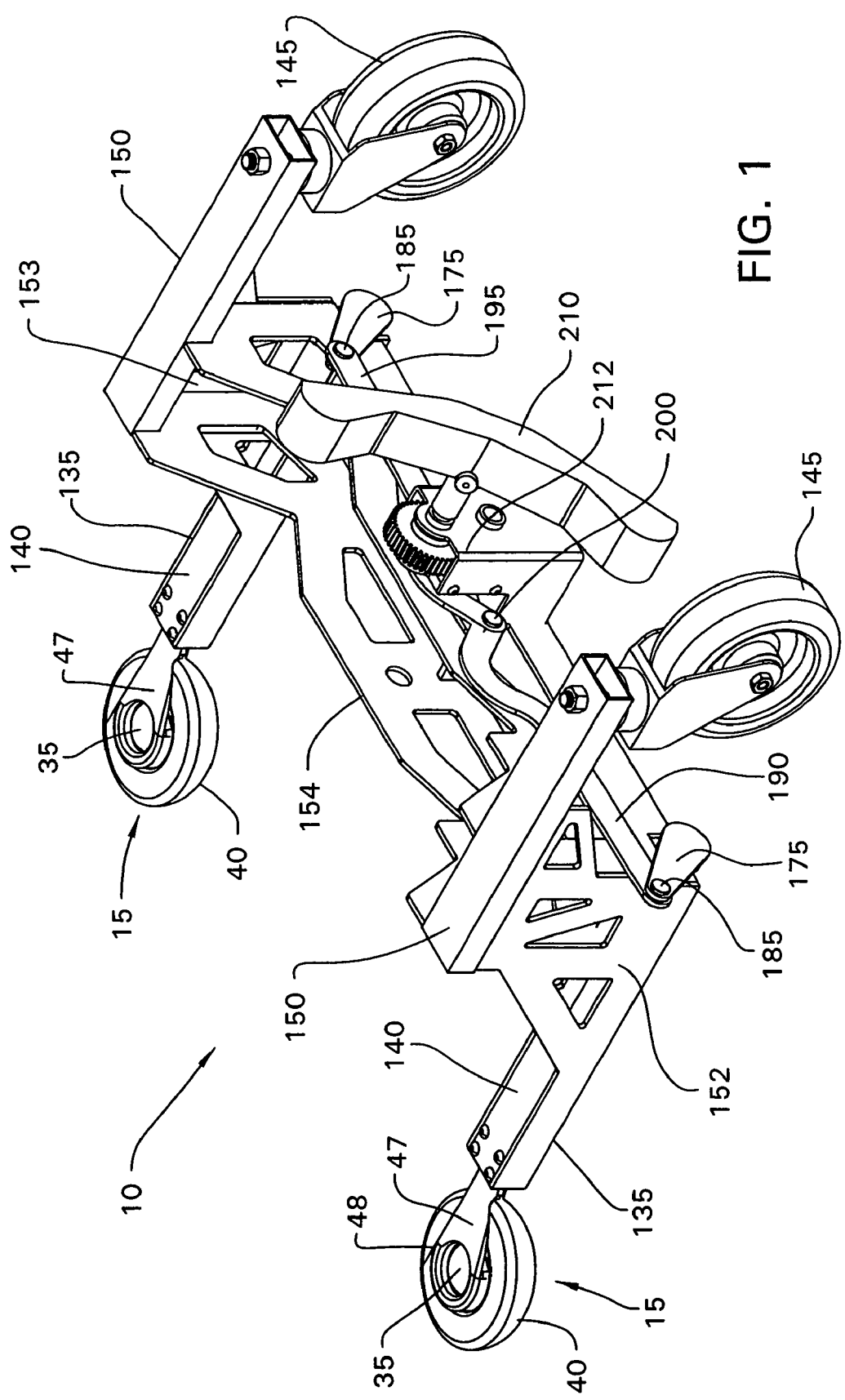
FIG. 1 is a perspective view of an equipment base with convertible low profile roller in a first, low profile configuration according to the invention.
Figure 2:
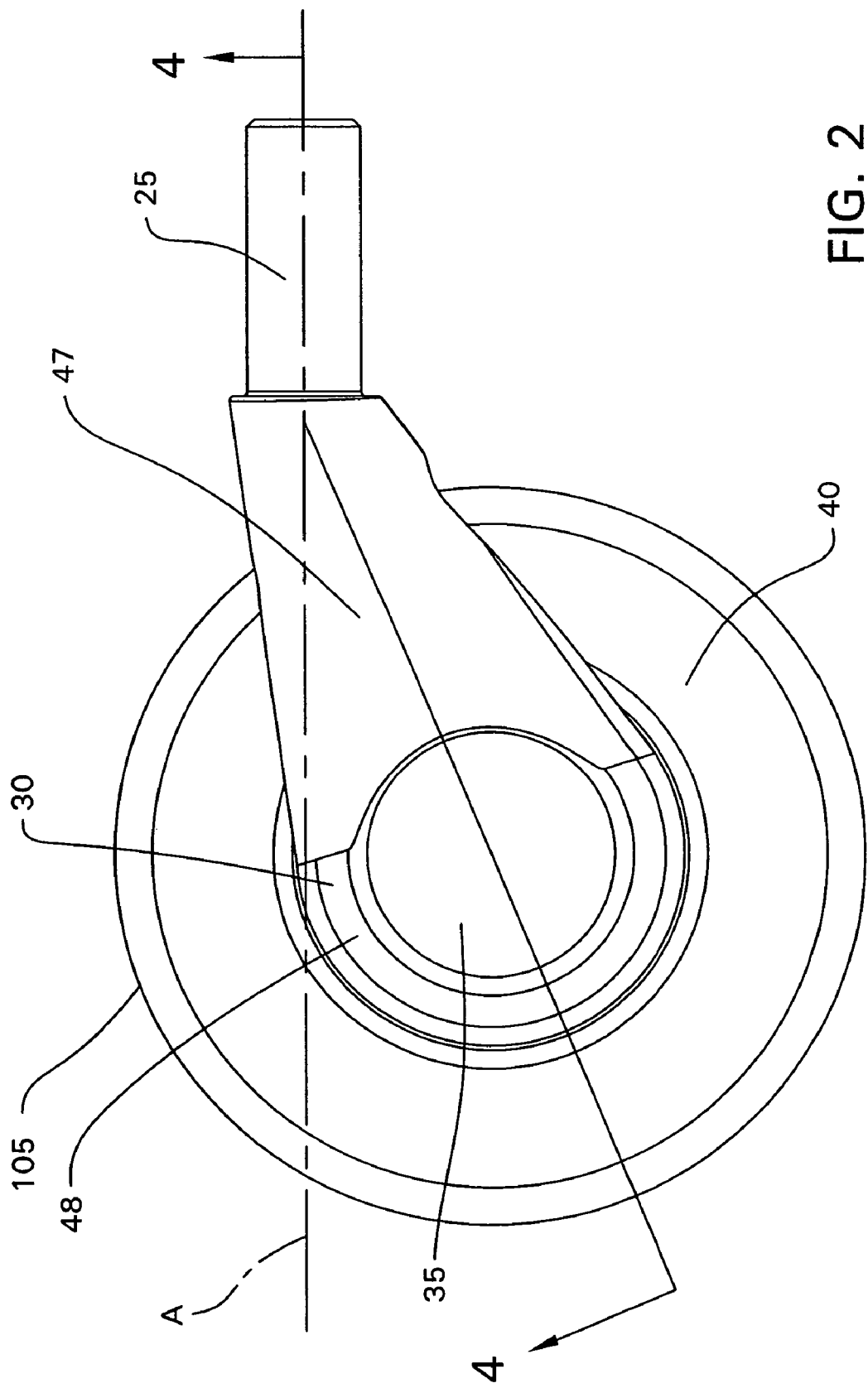
FIG. 2 is a plan view of the convertible low profile roller of FIG. 1.

Referring to FIGS. 1-4, a rolling equipment base 10 includes convertible low profile rollers 15 according to the invention. Each convertible low profile roller 15 includes a frame 20 having an arm portion 25 and a hub portion 30. A roller ball 35 is received within the center of the hub portion 30, and a wheel 40 is received for rolling about the outside 45 of the hub portion 30.

Figure 4:
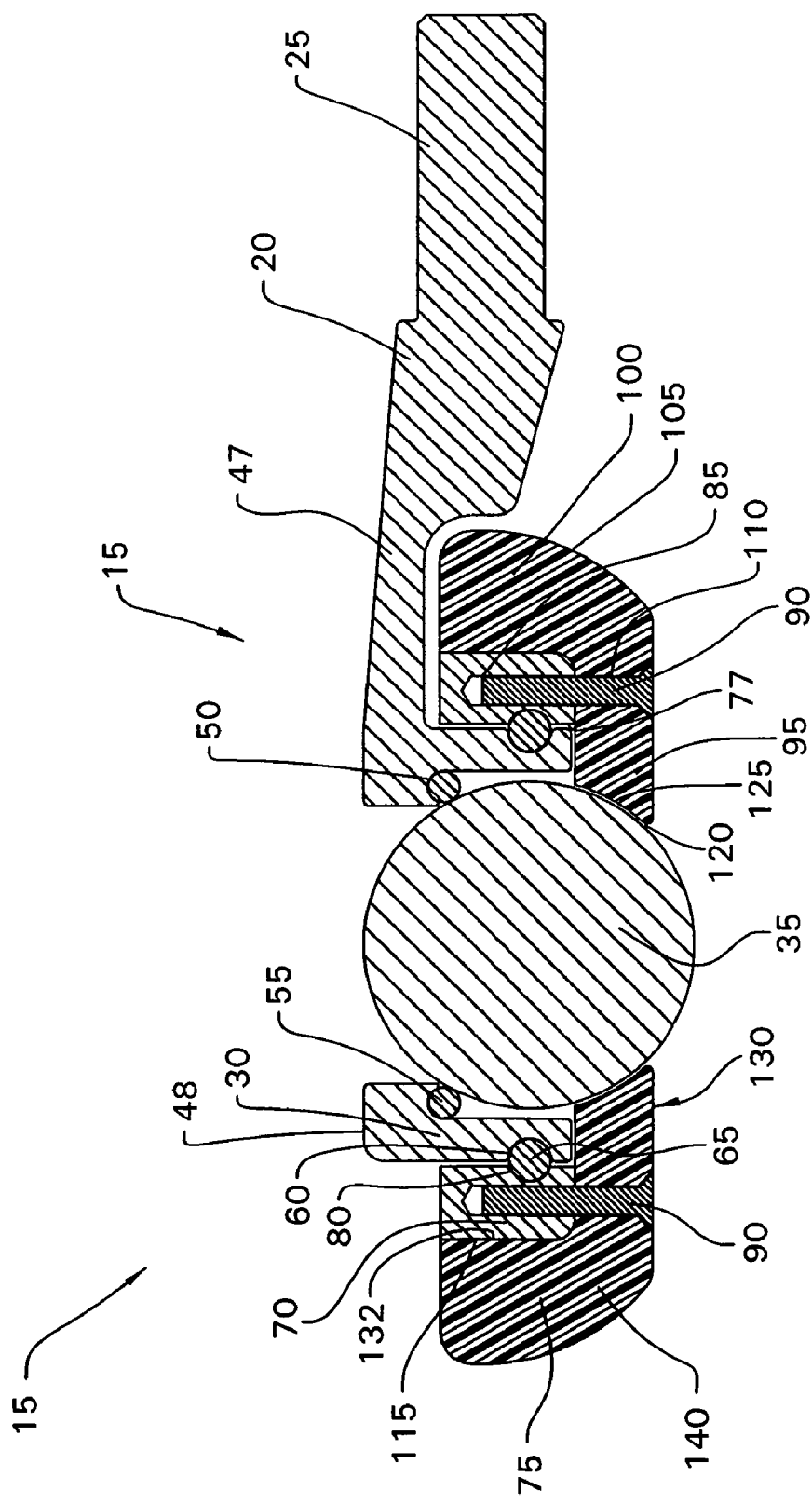
FIG. 4 is a cross-sectional view taken through line 4-4 of FIG. 2.

The hub portion 30 is connected to the arm portion 25 of the frame 20 by an offset portion 47. The hub portion 30 forms a hollow cylinder having an upper surface 48. The cylinder is oriented eccentrically by the offset portion 47 from an axis of rotation A defined by the arm portion 25. The hub portion 30 includes an internal bearing race 50 for receiving internal bearings 55 and an external bearing race 60 for receiving external bearings 65, as shown in FIG. 4. The roller ball 35 is received within the hub portion 30 for rotational movement against the internal bearings 55.

The wheel 40 includes an annular inner rim portion 70 and an outer tread portion 75. The inner rim portion 70 includes an inner surface 77 having a bearing race 80 for receiving the external bearings 65. The inner rim portion 70 is thereby received for rolling on the hub portion 30 with the external bearings 65 received between the external bearing race 60 of the hub portion 30 and the bearing race 80 on the inner surface 77 of the inner rim portion 70.

The inner rim portion 70 further includes a plurality of apertures 85 for receiving a plurality of fasteners 90. In a preferred embodiment, the apertures 85 and the fasteners 90 are threaded. The outer tread portion 75 of the wheel 40 includes a lateral surface portion 95 and a rolling contact portion 100 having an outer surface 105. The lateral surface portion 95 includes a plurality of apertures 110 configured to align with the apertures 85 of the inner rim portion 70. The outer tread portion 75 is thereby configured for attachment to the inner rim portion 70 by passing the fasteners 90 through the apertures 110 of the outer tread portion 75 and into the apertures 85 of the inner rim portion 70.

The outer tread portion 75 is dish-shaped in cross-section, having a vertical inner wall 115 (as seen in FIG. 4). The bottom of the "dish" is formed by the lateral surface portion 95, and includes a central opening 120. The opening 120 is bounded by an arcuate/spherical surface 125. The opening 120 and spherical surface 125 are configured for receiving the roller ball 35. The roller ball 35 is thereby retained for rolling on the internal bearings 55 within the hub portion 30 by the arcuate surface 125, with a portion of the roller ball 35 extending beyond an external face 130 of the lateral surface portion 95.

The annular inner rim portion 70 has an outer surface 132. The outer surface 132 is configured to conform closely to the inner wall 115 of the outer tread portion 75. The outer tread portion 75 is thereby closely received on the inner rim portion 70 and secured thereto by the plurality of fasteners 90.

The convertible low profile roller 15 is configured for mounting to the rolling equipment base 10, such as for an overbed table or other hospital equipment cart, wherein it is preferable for a portion of the base 10 to roll or slide underneath the base of another article of equipment having little clearance. The roller 15 is mounted for conversion between a low profile mode, shown in FIGS. 1 and 5-7, and a high profile mode shown in FIGS. 8-10.

Figure 5:
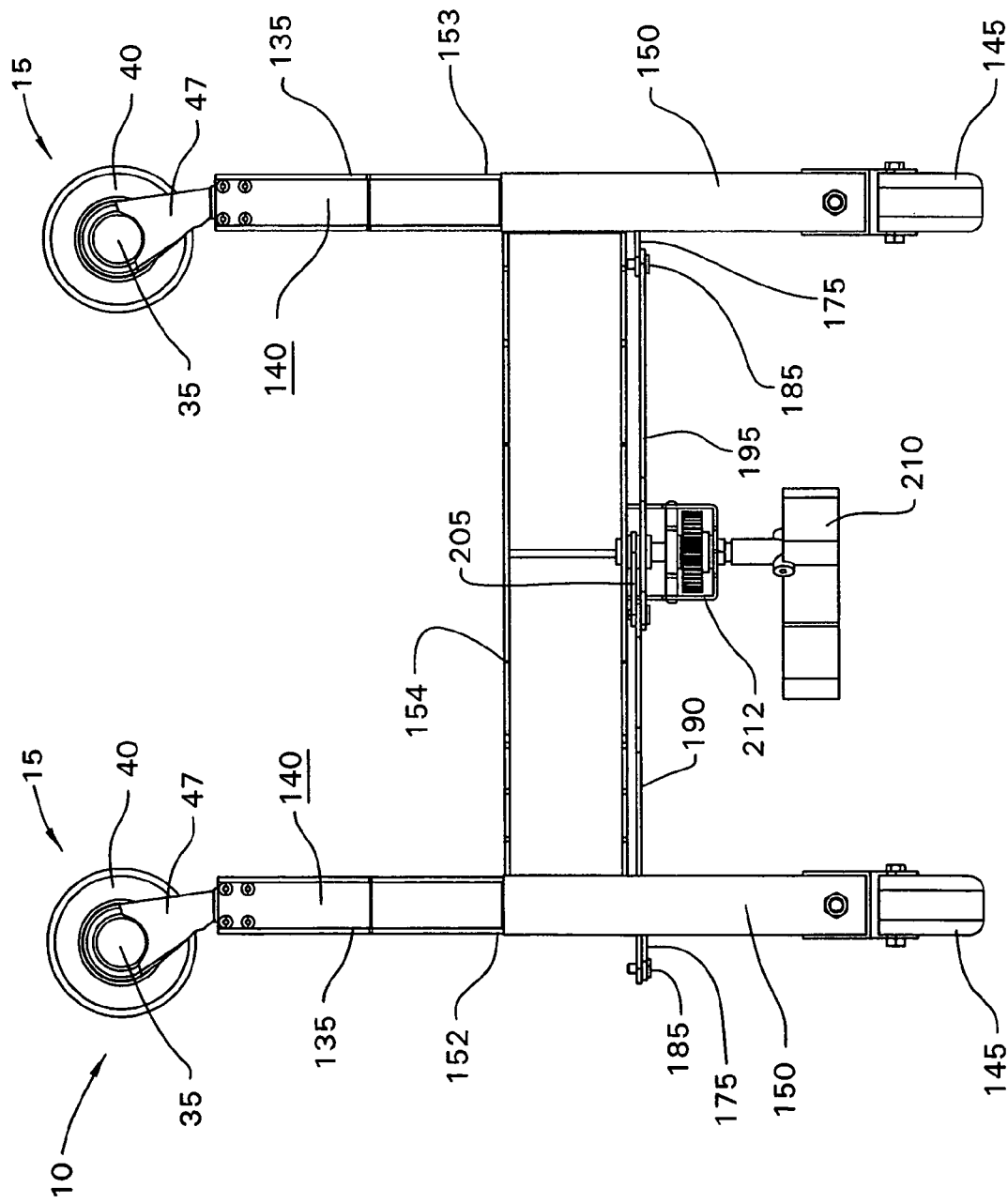
FIG. 5 is a plan view of the equipment base with convertible low profile roller in the first, low profile configuration of FIG. 1.
Figure 6:
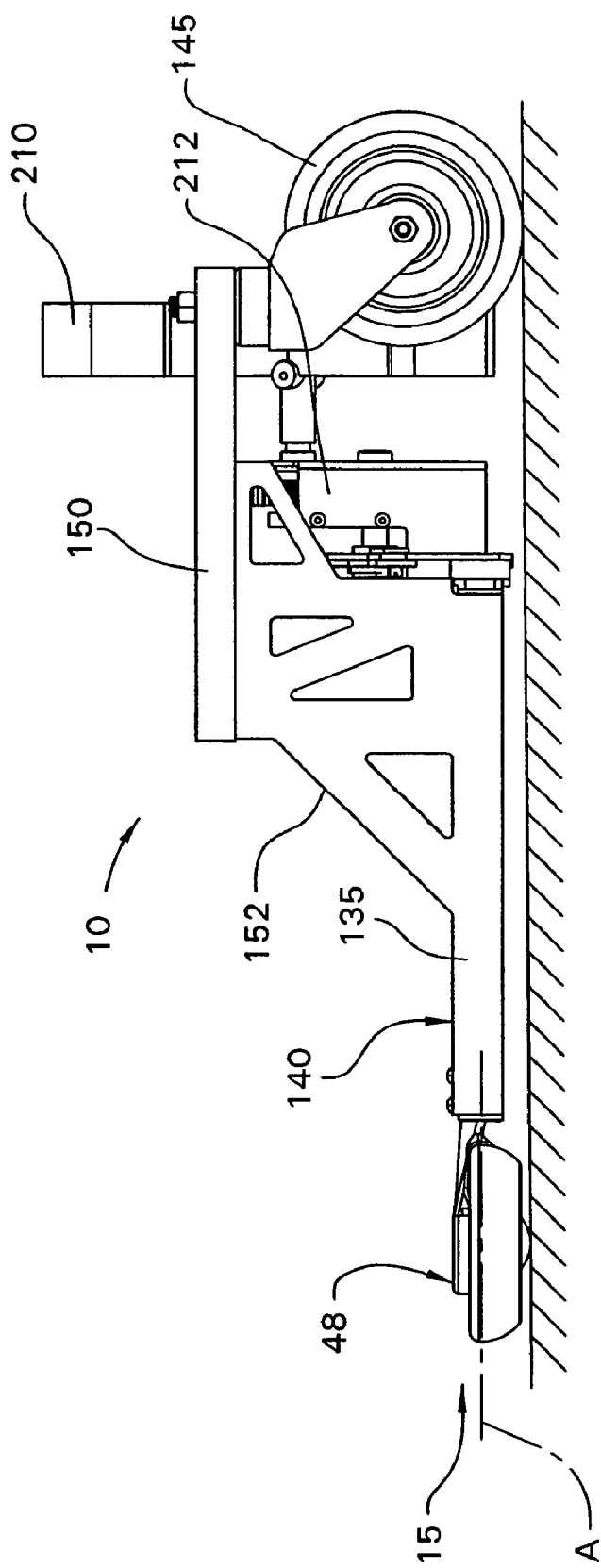
FIG. 6 is a side view of the equipment base with convertible low profile roller in the first, low profile configuration of FIGS. 1 and 5.
Figure 7:
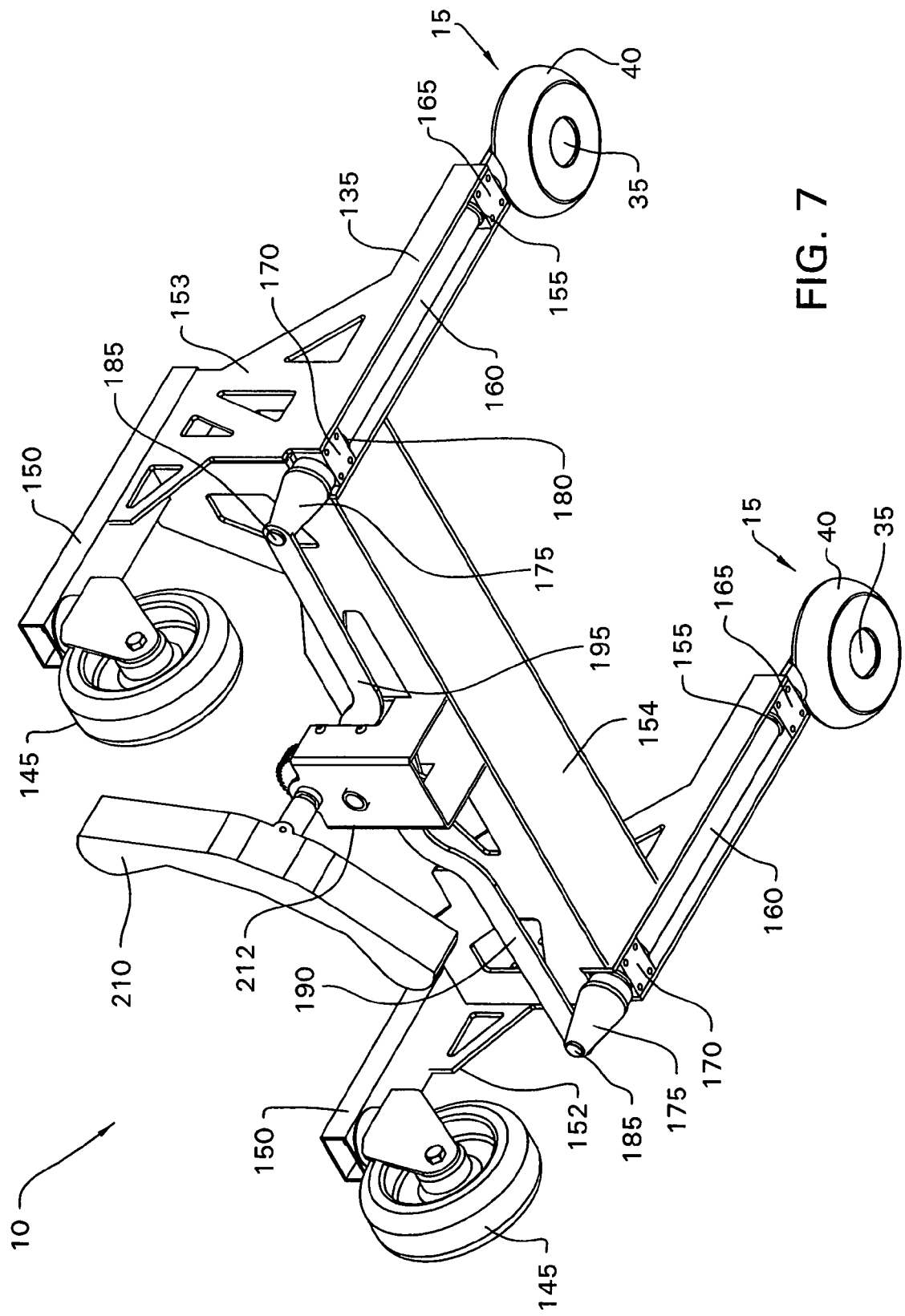
FIG. 7 is a bottom perspective view of the equipment base with convertible low profile roller in the first, low profile configuration of FIGS. 1, 5 and 6.

Referring to FIG. 1, a pair of rollers 15 is shown extending from a pair of forward horizontal legs 135 of the base 10 in the low profile mode. As shown in FIGS. 5-7, in the low profile mode, the convertible low profile roller 15 is positioned so that the roller ball 35 extends beyond the external face 130 and is oriented to contact a floor surface. As shown particularly in the side view of FIG. 6, in the low profile mode, the low profile roller 15 is oriented so that the upper surface 48 is substantially coplanar with an upper surface 140 of the horizontal leg 135.

The base 10 is supported by the roller balls 35 and a pair of swivel-mounted wheels 145 attached to a pair of rearward horizontal legs 150. The forward and rearward horizontal legs 135, 150 are connected by side plates 152, 153. The side plates 152, 153 are connected in a parallel orientation by a central frame 154. The convertible rollers 15 and the wheels 145 support the base 10 in a level orientation, with forward and rearward horizontal legs 135, 150 parallel to the floor surface.

Referring to FIG. 7, each of the convertible low profile rollers 15 is fixedly mounted to a forward end 155 of a respective pivot sleeve 160. The pivot sleeve 160 is tubular and non-rotatably receives the arm portion 25 of the frame 20 of the roller 15. Each pivot sleeve 160 is housed within a respective forward horizontal leg 135 of the base 10. Each pivot sleeve is rotatably supported within the horizontal leg 135 by a forward bushing 165 and a rearward bushing 170, both of which are fixed to the horizontal leg 135.

A lever arm 175 is fixedly attached to a rearward end 180 of each pivot sleeve 160. Each of the lever arms 175 are attached in a like orientation with respect to the low profile roller 15 mounted to the forward end 155 of the respective pivot sleeve 160, so that when the low profile rollers 15 are parallel to each other, the lever arms 175 are also parallel to each other. Each lever arm 175 includes a pivot pin 185. A link 190, 195 is pivotally mounted to a respective lever arm 175 by its pivot pin 185. The links 190, 195 are connected by a central pivot pin 200 to each other and to a central lever arm 205. The links 190, 195 are configured in length so that the lever arms 175 are parallel to each other and so that the low profile rollers 15 will also be parallel to each other.

The central lever arm 205 is operably connected to a butterfly foot lever 210 pivotally mounted to the central frame 154. In the illustrated embodiment, the butterfly foot lever 210 and the central lever arm 205 are operably connected by a gear arrangement 212. In a gear arrangement 212 with a 1:1 transmission ratio, the butterfly lever 210 and the central lever arm 205 will rotate to the same degree. If the central lever arm 205 is the same length as the lever arms 175, a rotation of the central lever arm 205 of 90 degrees will be necessary to translate to a rotation of 90 degrees by the rollers 15 from the low profile mode to the high profile mode. In an alternative embodiment, the central lever arm 205 is longer than each of the lever arms 175, so that the central lever arm 205 need not rotate the full 90 degrees to effect a 90 degree rotation of the lever arms 175 and the rollers 15. In a further alternative embodiment, the gear arrangement 212 has a transmission ratio that is not 1:1, and the butterfly foot lever 210 and the central lever arm 205 rotate at different rates; for instance, a rotation of the butterfly foot lever 210 of less than 90 degrees rotates the central lever arm 205 to provide a resultant rotation of 90 degrees by the rollers 15. In yet a further alternative embodiment, the butterfly foot lever 210 and the central lever arm 205 are mounted on a common shaft for rotation together. The alternative embodiments can also be used in combination in a manner well known to one skilled in the art, in order to produce an end result of a 90 degree rotation of the lever arms 175 and the rollers 15.

Figure 8:
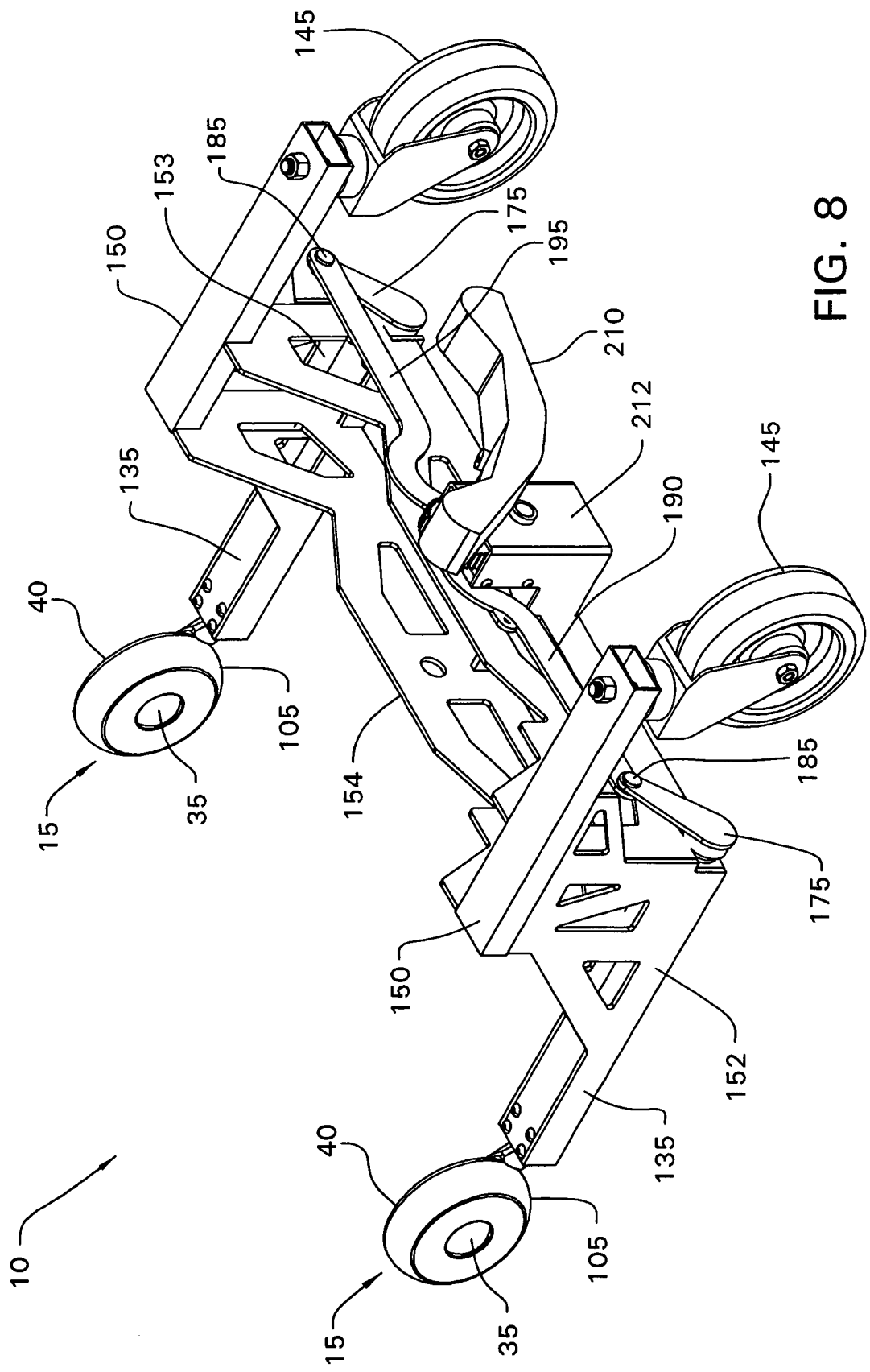
FIG. 8 is a perspective view of the equipment base with convertible low profile roller of FIG. 1 in a second, high profile configuration.
Figure 9:
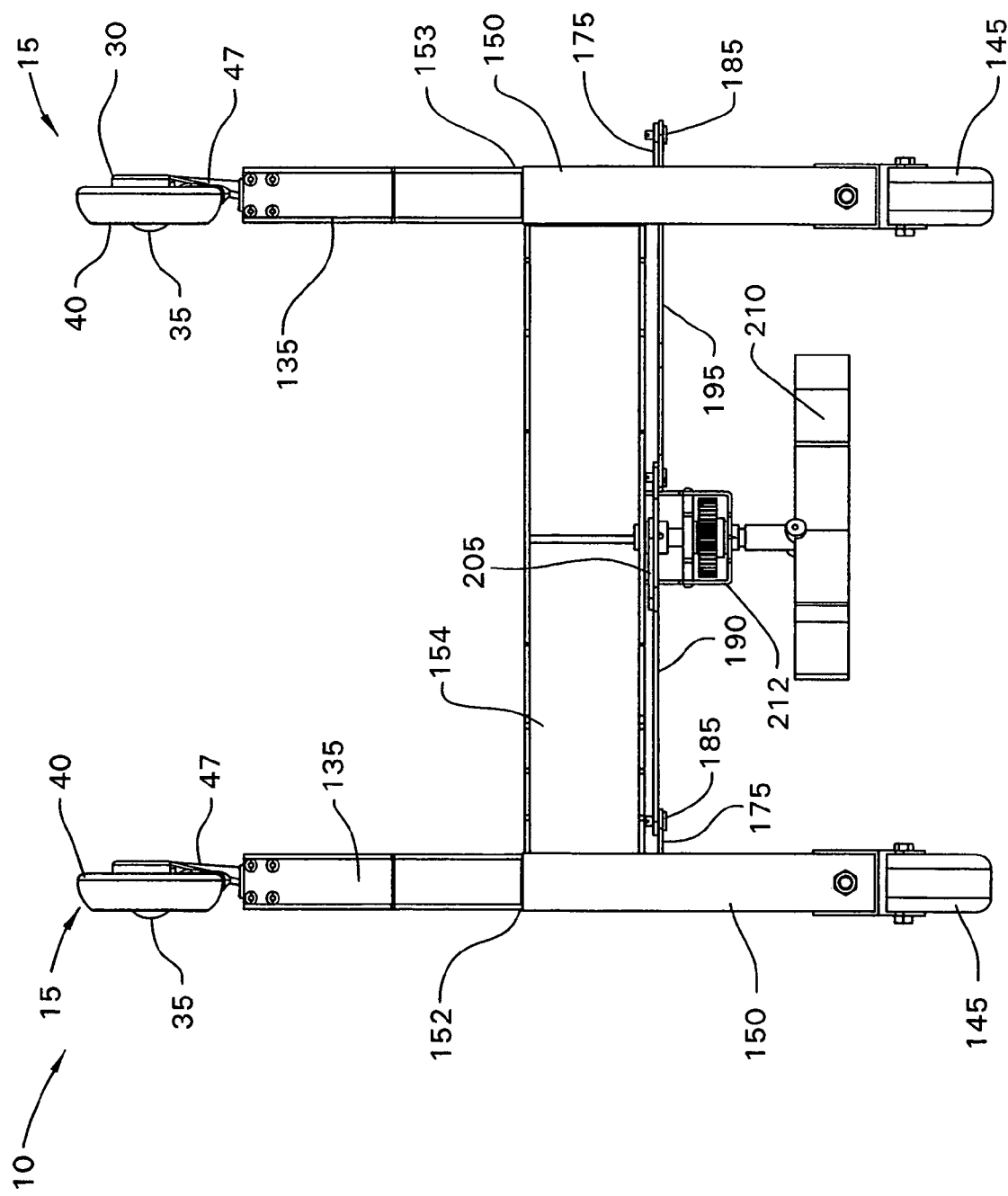
FIG. 9 is a plan view of the equipment base with convertible low profile roller in the second, high profile configuration of FIG. 8.
Figure 10:
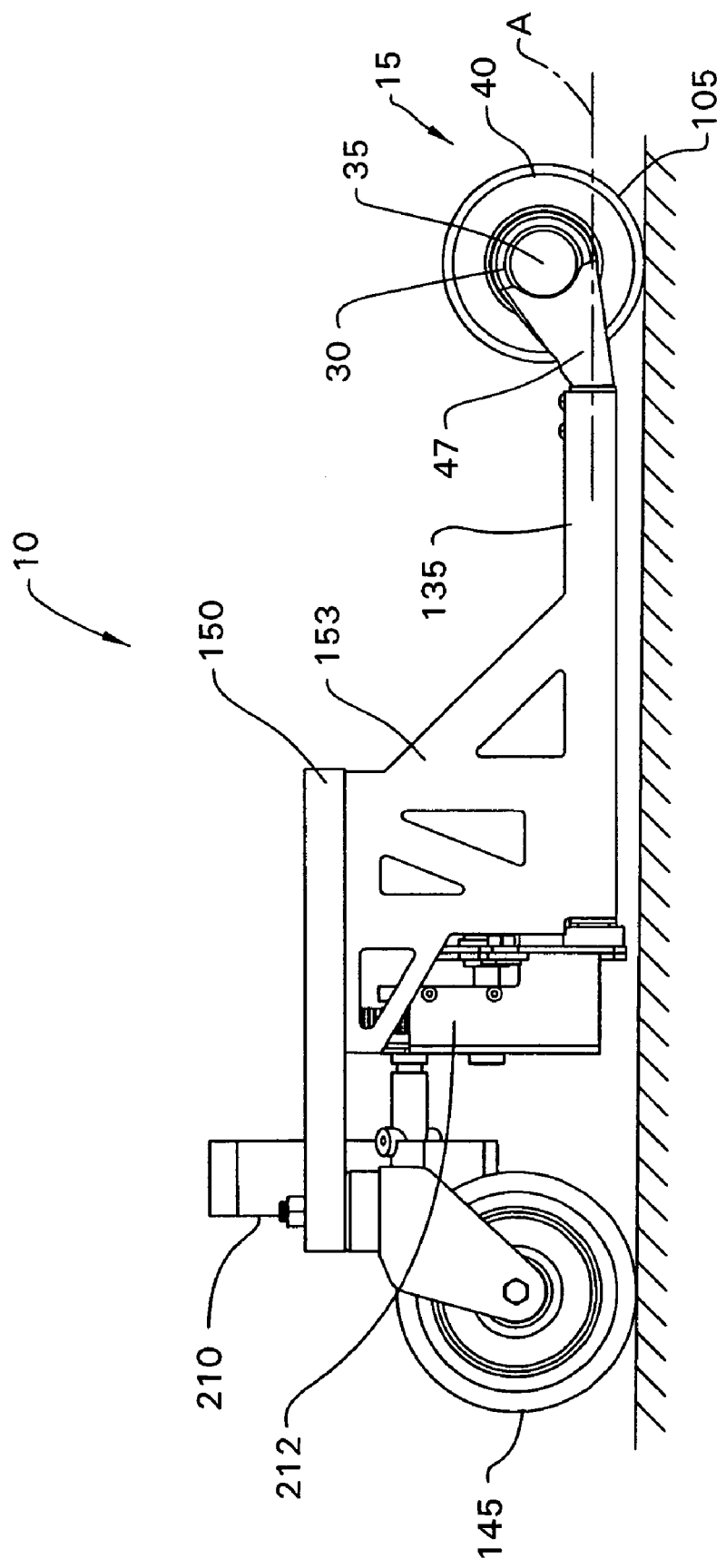
FIG. 10 is a side view of the equipment base with convertible low profile roller in the second, high profile configuration of FIGS. 8-9.
Figure 13:
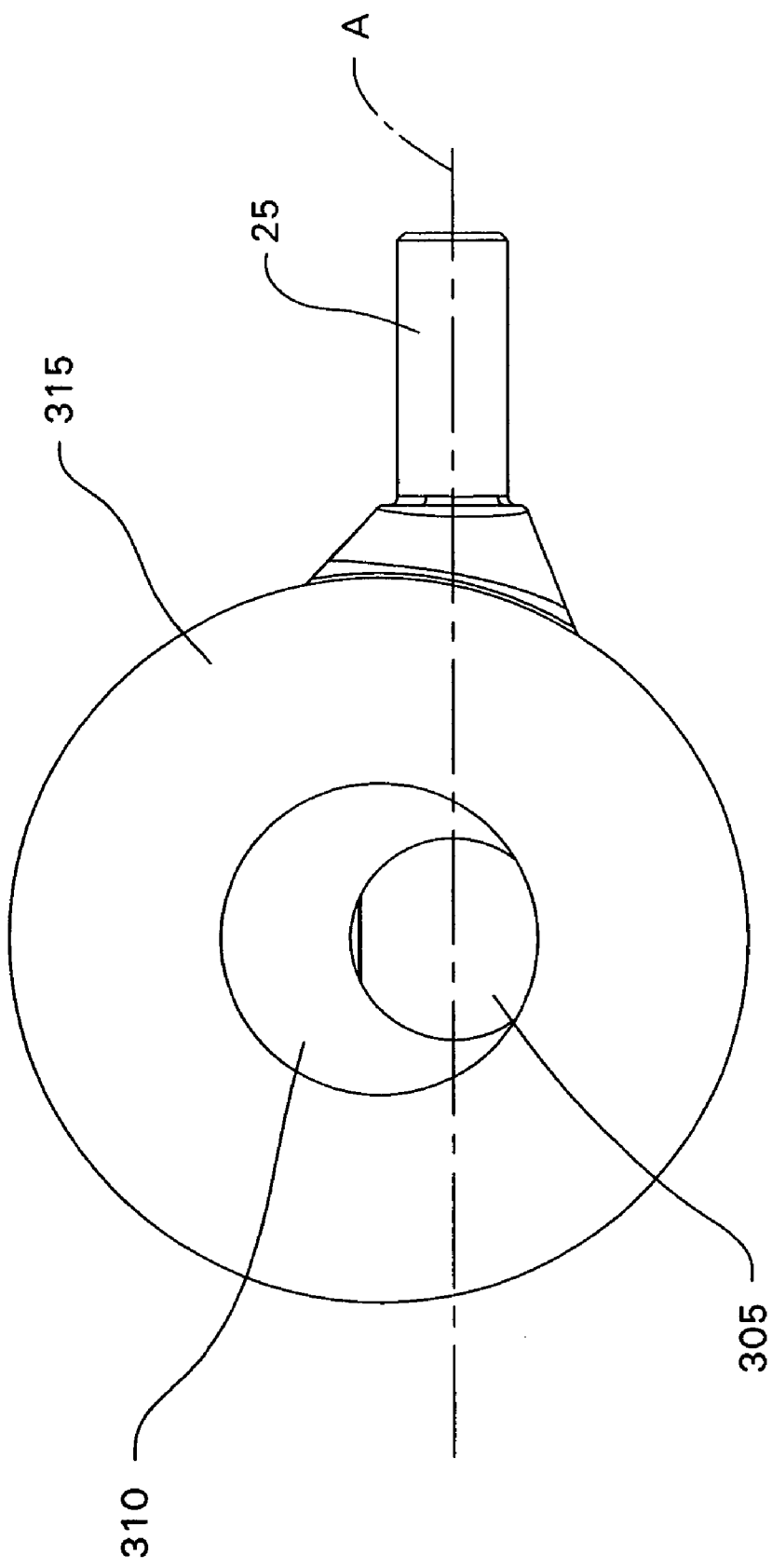
FIG. 13 is a bottom view of the convertible low profile roller of FIGS. 11-12.
Figure 14:
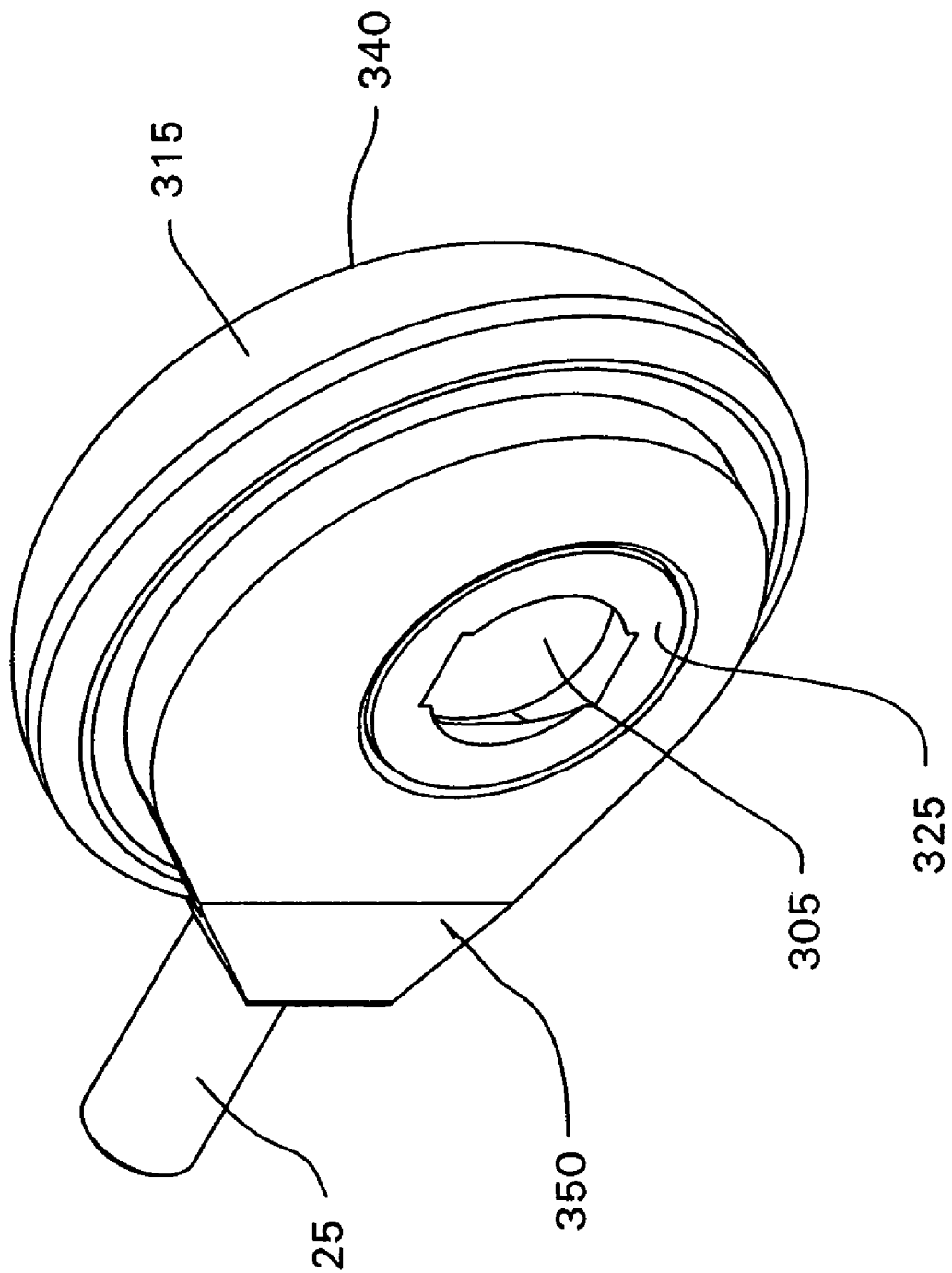
FIG. 14 is a perspective view of the convertible low profile roller of FIGS. 11-13 in a high profile orientation.

Referring now to FIGS. 8-10, the rollers 15 have been rotated from the first, low profile mode of FIGS. 1 and 5-7 to the second, high profile mode. The butterfly foot lever 210 has been rotated clockwise by 90 degrees. In turn, the central lever arm 205 has been rotated 90 degrees, effecting a 90 degree rotation of the lever arms 175 through the links 190, 195. The rollers 15 rotate as the respective lever arm 175 rotates the respective pivot sleeve 160.

Figure 3A:
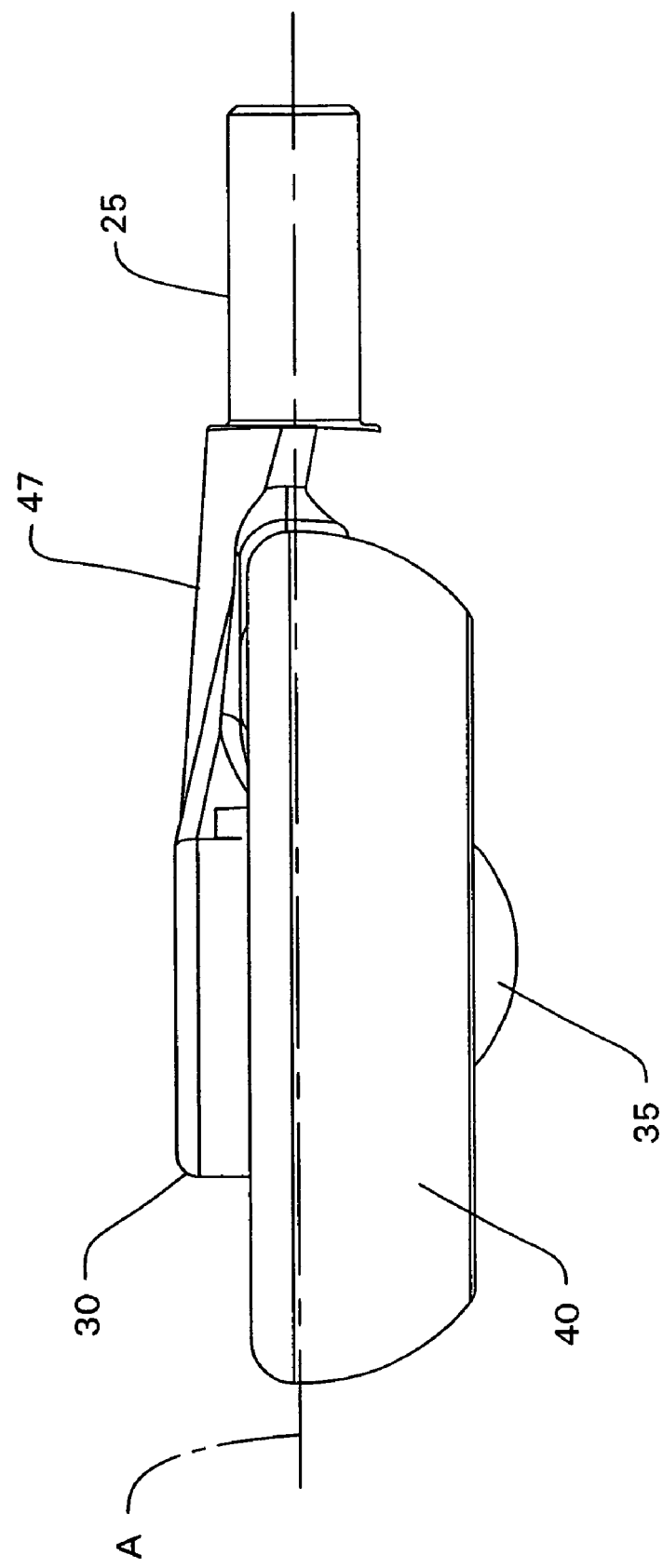
FIG. 3A is a side view of the convertible low profile roller of FIGS. 1-2.

With particular reference to FIG. 10, it can be seen that due to the eccentric orientation of the hub portion 30, by the offset portion 47, with respect to the axis A defined by the arm portion 25 (see also FIG. 2), the rolling outer surface 105 that is oriented to the floor is not separated from the axis A of the arm portion 25 by the full measure of the radius of the wheel 40. Rather, the arm portion 25 is maintained at the same height above the floor in both the first, low profile mode of FIGS. 1 and 5-7 and the second, high profile mode of FIGS. 8-10. This can be seen by comparing FIG. 6 with FIG. 10, wherein it is apparent that the forward and rearward horizontal legs 135, 150 remain substantially parallel to the floor surface in both the low profile and high profile modes. This is also illustrated in FIG. 3B, which shows an equivalent distance B from the axis A of the arm portion 25 to the rolling surface 105 and from the axis A of the arm portion 25 to the surface of the roller ball 35. The equipment base 10 is thereby maintained in a level orientation in either mode, but in the high profile mode the equipment base enjoys the advantage of the larger radius wheel for smoother rolling.

In a further embodiment according to the invention, shown in FIGS. 11-14, a convertible low profile roller 300 includes a small diameter caster wheel 305 mounted within a hub 310 of a large diameter wheel 315. The small diameter caster wheel 305 is mounted offset from the center of rotation of the large wheel 315, generally in line with the longitudinal axis A of the arm portion 25.

The small diameter caster wheel 305 is illustrated as rotationally mounted on an axle 320 within a carriage 325. The carriage 325 can be rotatably mounted within a cavity 330 in the hub 310 of the large diameter wheel 315. Rotation of the carriage 325 is not necessary, however, where the equipment base 10 includes swivel-mounted wheels 145 that can be used for steering the base 10, as shown in FIG. 1. As in the first embodiment of FIGS. 1-10, the large diameter wheel 315 is rotatably mounted to the hub 310.

The small diameter wheel 305 has a rolling surface 335 with an arcuate cross-section, as shown in FIG. 12. The large diameter wheel 315 includes a rounded shoulder portion 340. The rounded shoulder portion 340 is configured to cooperate with the arcuate cross-section of the rolling surface 335 of the small diameter wheel 305. As the convertible low profile roller 300 is rotated about the longitudinal axis A from the high profile position to the low profile position or vice versa, the rounded shoulder portion 340 and the rolling surface 335 will both be in contact with a floor surface. The floor surface intersects tangentially with both the rolling surface 335 and the rounded shoulder 340, and the rounded shoulder 340 in particular provides for a continuous smooth contact and rotation of the convertible low profile roller 300 relative to the floor surface.

The mounting of the small diameter caster wheel 305 within the hub 310, offset from the center of the large wheel 315, serves multiple purposes. The position of the small diameter caster wheel 305, with its rolling surface 335 having an arcuate cross-section, provides the smooth transition from the small diameter wheel 305 to the large diameter wheel 315 as the convertible low profile roller 300 is rotated from the low profile mode to the high profile mode as discussed above. In addition, the alignment of the small diameter caster wheel 305 with the longitudinal axis A of the arm portion 25 eliminates the torsion load on the assembly that would be present when in the low profile mode of operation if the point of load bearing were offset from the longitudinal axis A.

In a further embodiment of the invention, it is anticipated that the convertible low profile roller 300 further comprises a "rest" or storage position, wherein the roller 300 is configured to further rotate from the high profile position in a direction opposite the low profile position. With the convertible low profile roller 300 so rotated, a stationary face 350, opposite from the exposed rolling surface 335 of the small diameter wheel 305, is placed in contact with the floor surface. The convertible low profile roller 300 is thereby supported by the stationary face 350. In order to prevent sliding, the stationary face 350 can be provided with a non-skid surface, so that the base unit is limited in its ability to move with the convertible low profile roller 300 in the rest position. It is anticipated that use of the butterfly foot lever 210 and gear arrangement 212 would require modification to provide a total range of rotation of 180 degrees, or that an alternate actuation assembly would be required.

Operation

The equipment base 10 can be moved next to a hospital bed or other equipment with the low profile roller 15 in the first, low profile mode, slipping the roller 15 and forward leg 135 under the base of the bed. Once moved away from the bed, the equipment base 10 and roller 15 can be shifted to the second, high profile mode for storage and transport over longer distances or uneven surfaces. The larger diameter of the wheel 40 of the convertible low profile roller 15 in the high profile mode is better adapted to rolling smoothly at higher speeds and over uneven surfaces.

With the butterfly lever rotated to the counterclockwise limit, the low profile rollers 15 are in the low profile mode. After the base 10 is removed from a confined space, the rollers 15 can be placed in the high profile mode of FIGS. 8-10. As the butterfly lever 210 is rotated clockwise, the central lever arm 205 rotates clockwise, shifting the links 190, 195 to the right. The shifting links 190, 195 force the lever arms 175 to rotate clockwise. Since the pivot sleeves 160 are rotationally fixed to the lever arms 175 and the low profile rollers 15, the rollers 15 rotate about the axis A of the arm portion 25. When the pivot sleeve 160 has rotated 90 degrees, the rollers 15 have rotated 90 degrees and are now in the high profile mode.

The overall height of the equipment base 10 has not changed, in that the horizontal legs 135, 150 are still parallel to the floor, as seen in FIG. 10. The equipment base 10 thus remains level while enjoying the advantage of the larger radius of the wheel 40.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A convertible low profile roller comprising:
  a hub;
  a first roller rotatably mounted to the hub and having an axis of rotation;
  a second roller rotatably mounted to the hub and having an axis of rotation;
  wherein the axis of rotation of the first roller intersects the second roller and the axis of rotation of the second roller intersects the first roller, and wherein the first roller is configured to contact a floor surface with the hub in a first orientation and the second roller is configured to contact the floor surface with the hub in a second orientation perpendicular to the first orientation.

2. The roller of claim 1, further comprising an arm portion, said hub being mounted to said arm portion.

3. The roller of claim 1, further in combination with a support base, the arm portion mounting the hub to the support base.

4. The roller of claim 3, wherein the support base comprises an equipment base.

5. The roller of claim 1 wherein the first roller defines a first height of the hub above the floor surface, the second roller defines a second height above the floor surface, and wherein the first height is greater than the second height.

6. The roller of claim 1 wherein the first roller comprises a ball and the second roller comprises a wheel.

7. A convertible low profile roller comprising:
   a hub;
   a first roller rotatably mounted to the hub;
   a second roller rotatably mounted to the hub;
   wherein the first roller is configured to contact a floor surface with the hub in a first orientation, the second roller is configured to contact the floor surface with the hub in a second orientation, the hub is mounted to an arm portion, and the hub is shifted from the first orientation to the second orientation by rotation of the arm portion about a longitudinal axis, wherein the first roller defines a first height of the arm portion above the floor surface, and the second roller defines a second height above the floor surface greater than the first height.

8. The roller of claim 7, wherein the longitudinal axis is offset from a center of the hub.

9. The roller of claim 8, wherein the first roller comprises a ball and the second roller comprises a wheel.

10. The roller of claim 7, further in combination with a support base, the arm portion mounting the hub to the support base.

11. A convertible low profile roller comprising:
    a hub;
    a first roller rotatably mounted to the hub;
    a second roller rotatably mounted to the hub;
    wherein the first roller is configured to contact a floor surface with the hub in a first orientation, the second roller is configured to contact the floor surface with the hub in a second orientation, the hub is mounted to an arm portion, and the hub is shifted from the first orientation to the second orientation by rotation of the arm portion about a longitudinal axis, wherein the hub comprises a hollow cylindrical portion, and the first roller is rotatably housed with the hollow cylindrical portion.

12. The roller of claim 11, wherein the second roller is rotatably mounted to an outer surface of the hollow cylindrical portion.

13. The roller of claim 11, wherein the longitudinal axis is offset from the center of the hub.

14. The roller of claim 11, further in combination with a support base, the arm portion mounting the hub to the support base.

15. A convertible low profile roller comprising:
    a hub;
    a first roller rotatably mounted to the hub;
    a second roller rotatably mounted to the hub;
    wherein the first roller is configured to contact a floor surface with the hub in a first orientation, the second roller is configured to contact the floor surface with the hub in a second orientation, the hub is mounted to an arm portion, the hub is shifted from the first orientation to the second orientation by rotation of the arm portion about a longitudinal axis, and wherein the first roller is a ball and the second roller is a wheel.

16. The roller of claim 15, wherein the hub comprises a hollow cylindrical portion, and the ball is rotatably housed with the hollow cylindrical portion.

17. The roller of claim 16, wherein the wheel is rotatably mounted to an outer surface of the hollow cylindrical portion.

18. A convertible low profile roller comprising:
    a hub;
    a central roller rotatably mounted to the hub;
    an outer roller rotatably mounted to the hub and adapted to receive the central roller;
    wherein the central roller is mounted centrally to the outer roller and the central roller is configured to contact a floor surface with the hub in a first orientation and the outer roller is configured to contact the floor surface with the hub in a second orientation.

19. The roller of claim 18, wherein the central roller defines a first height of the hub above the floor surface, and the outer roller defines a second height above the floor surface greater than the first height.

20. The roller of claim 18, wherein the central roller is spherical and the outer roller comprises an annular wheel.

21. The roller of claim 18, further in combination with a support base, wherein the hub is mounted to the support base.

22. The roller of claim 21, wherein the support base comprises an equipment base.

* * * * *

UNITED STATES PATENT AND TRADEMARK OFFICE
CERTIFICATE OF CORRECTION

PATENT NO. : 7,441,786 B2 Page 1 of 1
APPLICATION NO. : 11/354801
DATED : October 28, 2008
INVENTOR(S) : Martin W. Stryker and James Thwaites It is certified that error appears in the above-identified patent and that said Letters Patent is hereby corrected as shown below:

Column 6:
Line 61, Claim 3, "claim 1" should be --claim 2--.

Signed and Sealed this

Seventh Day of April, 2009

JOHN DOLL
*Acting Director of the United States Patent and Trademark Office*